(12) United States Patent
Takizawa

(10) Patent No.: US 8,319,818 B2
(45) Date of Patent: Nov. 27, 2012

(54) INFORMATION PROCESSING DEVICE, INFORMATION PROCESSING METHOD AND STORAGE MEDIUM STORING COMPUTER PROGRAM

(75) Inventor: Shuichi Takizawa, Chiba (JP)

(73) Assignee: Sony Corporation, Tokyo ( * ) Notice: Subject to any disclaimer, the term of this patent is extended or adjusted under 35 U.S.C. 154(b) by 528 days.

(21) Appl. No.: 12/587,390

(22) Filed: Oct. 6, 2009

(65) Prior Publication Data

US 2010/0091087 A1    Apr. 15, 2010

(51) Int. Cl.
*H04N 7/14* (2006.01)
(52) U.S. Cl. .................. 348/14.01; 348/14.14
(58) Field of Classification Search ............... 348/14.01, 348/14.02, 14.06, 14.08, 14.14, 14.15; 379/93.23, 379/93.17
See application file for complete search history.

(56) References Cited

U.S. PATENT DOCUMENTS

| | | | |
|---|---|---|---|
| 2003/0025786 A1* | 2/2003 | Norsworthy | 348/14.08 |
| 2008/0144941 A1 | 6/2008 | Togashi | |
| 2009/0074164 A1* | 3/2009 | Cansler et al. | 379/142.06 |
| 2009/0257623 A1* | 10/2009 | Tang et al. | 348/14.08 |

FOREIGN PATENT DOCUMENTS

| | | |
|---|---|---|
| JP | 04042654 A | 2/1992 |
| JP | 04294667 A | 10/1992 |
| JP | 07038868 A | 2/1995 |
| JP | 2002281469 A | 9/2002 |
| JP | 2003244633 A | 8/2003 |
| JP | 2006-140871 A | 6/2006 |
| JP | 2006-352309 A | 12/2006 |
| JP | 2007-261722 A | 10/2007 |
| JP | 2007-279776 A | 10/2007 |
| JP | 2008-152530 A | 7/2008 |
| JP | 2009094659 A | 4/2009 |

OTHER PUBLICATIONS

Office Action from Japanese Application No. 2008-261020, dated Jul. 27, 2010.
Office Action from Japanese Application No. 2008-261020, dated Mar. 15, 2011.

* cited by examiner

*Primary Examiner* — Stella Woo
(74) *Attorney, Agent, or Firm* — Lerner, David, Littenberg, Krumholz & Mentlik, LLP

(57) ABSTRACT

There is provided an information processing device including a recipient information recording portion that records recipient party information, an image recording portion that records images of the recipient party taken on the recipient party side during a call, an image extraction portion that extracts an image at a predetermined point in time from the images recorded in the image recording portion, and a registration portion that, after the call is ended, associates the image extracted by the image extraction portion with the recipient party information and registers the associated image in the recipient party information recording portion.

11 Claims, 8 Drawing Sheets

FIG.6
VIDEOPHONE　　　　　　　DURING CALL 0:30
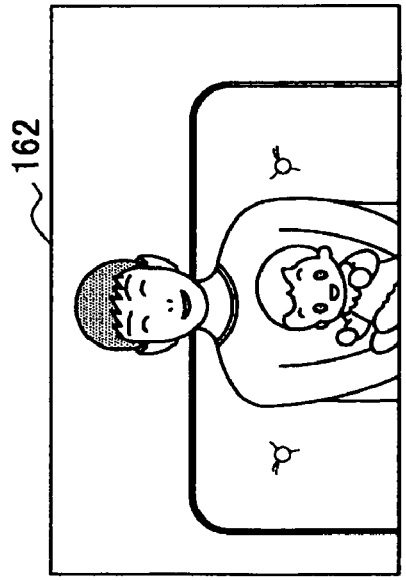
HOME
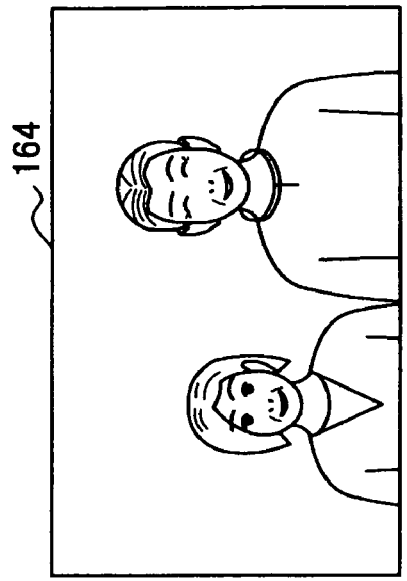
GRANDPA, GRANDMA
CAMERA: OFF　　　OPTION: FUNCTION DISPLAY　　　: END CALL

INFORMATION PROCESSING DEVICE, INFORMATION PROCESSING METHOD AND STORAGE MEDIUM STORING COMPUTER PROGRAM

CROSS-REFERENCE TO RELATED APPLICATION

The present application claims priority from Japanese Patent Application No. JP 2008-261020 filed in the Japanese Patent Office on Oct. 7, 2008, the entire content of which is incorporated herein by reference.

BACKGROUND OF THE INVENTION

1. Field of the Invention

The present invention relates to an information processing device, an information processing method and a storage medium storing a computer program. More specifically, the present invention relates to an information processing device, an information processing method and a storage medium storing a computer program that have video phone functions.

2. Description of the Related Art

Some telephones have a function to display an image of a recipient party on a screen (a video phone function), based on information from the recipient party. Such telephones mutually use a compact imaging device to take video of a calling party and the video is transmitted along with audio of the calling party to the recipient party, thus achieving video phone functions.

Some of these telephones are provided with an address book function that stores information, such as a name, a telephone number and an electronic mail address etc. in correspondence with each other (address book information). Furthermore, recently, by registering and storing images in individual address book information, it is now possible to display images as address book information. A user using a telephone with video phone functions can place a telephone call to a recipient party from an address book by checking information registered in the address book.

SUMMARY OF THE INVENTION

However, in known art, it is difficult to register an image in individual address book information without storing the image in advance in the telephone. Furthermore, to register a video in individual address book information, it is necessary to edit the video on a device other than the telephone.

In light of the foregoing, it is desirable to provide a novel and improved information processing device, information processing method and storage medium storing a computer program that allow easy registration of an image in an address book by storing a video that is transmitted from a recipient party during a call using video phone functions and by registering, after the call is ended, an image in address book information using the stored video.

According to an embodiment of the present invention, there is provided an information processing device including a recipient information recording portion that records recipient party information, an image recording portion that records images of the recipient party taken on the recipient party side during a call, an image extraction portion that extracts an image at a predetermined point in time from the images recorded in the image recording portion, and a registration portion that, after the call is ended, associates the image extracted by the image extraction portion with the recipient party information and registers the associated image in the recipient party information recording portion.

According to such configuration, a recipient information recording portion records recipient party information, an image recording portion records images of the recipient party taken on the recipient party side during a call, an image extraction portion extracts an image at a predetermined point in time from the images recorded in the image recording portion, a registration portion that, after the call is ended, associates the image extracted by the image extraction portion with the recipient party information and registers the associated image in the recipient party information recording portion. As a result, the information processing device allow easy registration of an image in an address book by storing a video that is transmitted from a recipient party and by registering, after the call is ended, an image in the recipient information recording portion using the stored video.

The image extraction portion may extract a still image. And the image extraction portion may extract, at a point in time at which there is an instruction from a user, a still image from the images recorded in the image recording portion. And the image extraction portion may extract, at a certain time interval, a still image from the images recorded in the image recording portion.

The image extraction portion may extract as a still image, from the images recorded in the image recording portion, a frame that includes a face.

The image extraction portion may detect a degree of change between frames of the images recorded in the image recording portion, and extracts as a still image a frame with a low degree of change.

The image extraction portion may extract a video. And the image extraction portion may extract, at a point in time at which there is an instruction from a user, a video from the images recorded in the image recording portion.

The image extraction portion may extract as a video, from the images recorded in the image recording portion, a frame that includes a face.

The image extraction portion may detect a degree of change between frames of the images recorded in the image recording portion, and extracts, as a video, frames with a low degree of change.

The information processing device further includes an audio recording portion that records audio during a call with a recipient party. The image extraction portion may extract, as a video, frames at a point in time at which a volume of audio recorded in the audio recording portion is louder than a volume at another point in time.

The information processing device further includes an audio recording portion that records audio of a recipient party during a call and an audio extraction portion that extracts audio at a predetermined point in time from the audio recorded in the audio recording portion. After the call is ended, the registration portion may register the image extracted by the image extraction portion and the audio extracted by the audio extraction portion in an address book.

According to another embodiment of the present invention, there is provided An information processing method, including the steps of recording images of a recipient party taken on the recipient party side during a call, extracting an image at a predetermined time point from the images recorded in the image recording step, and after the call is ended, associating the image extracted in the image extracting step with recipient party information and registering the associated image in a recipient party information recording portion that records the recipient party information.

According to another embodiment of the present invention, there is provided A storage medium storing a computer program that includes instructions that command a computer to perform the steps of recording images of a recipient party taken on the recipient party side during a call, extracting an image at a predetermined time point from the images recorded in the image recording step, and after the call is ended, associating the image extracted in the image extracting step with recipient party information and registering the associated image in a recipient party information recording portion that records the recipient party information.

As described above, according to the present invention, by storing video transmitted from a recipient party during a call using video phone functions, and by registering video in address book information using the stored video after the call is ended, a novel and improved information processing device, information processing method and storage medium storing a computer program can be provided that allow easy registration of images in an address book.

BRIEF DESCRIPTION OF THE DRAWINGS

FIG. 6 is an explanatory diagram showing an example of a call screen displayed on a display 101;

DETAILED DESCRIPTION OF THE INVENTION

Figure 1:
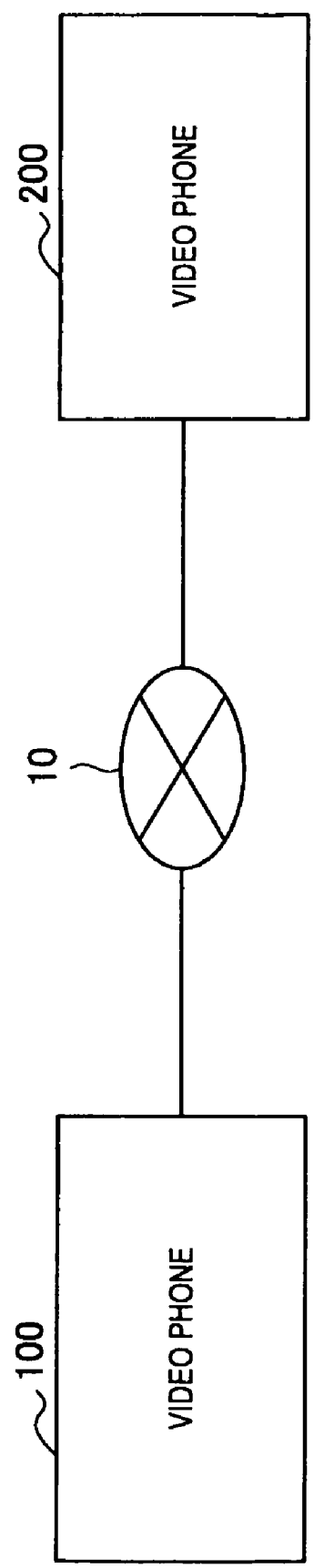
FIG. 1 is an explanatory diagram illustrating the configuration of a video phone system using a telephone with video phone functions according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The preferred embodiment for practicing the present invention will be explained in the order shown below.

1. Configuration of video phone system according to embodiment of present invention
2. Hardware configuration of video phone according to embodiment of present invention
3. Functional configuration of video phone according to embodiment of present invention
4. Operation of video phone according to embodiment of present invention
5. Modified example 1. Configuration of Video Phone System According to Embodiment of Present Invention First, the configuration of a video phone system using a telephone with video phone functions according to an embodiment of the present invention will be explained. FIG. 1 is an explanatory diagram illustrating the configuration of the video phone system using a telephone with video phone functions according to the embodiment of the present invention. Hereinafter, the configuration of the video phone system using the telephone with video phone functions according to the embodiment of the present invention will be explained with reference to FIG. 1.

As shown in FIG. 1, in a video phone system 1 according to the embodiment of the present invention, a video phone 100 and a video phone 200 are in a state of connection via a network 10. Note that the network 10 may be wired or wireless. Furthermore, the network 10 may be an Internet Protocol (IP) network, a public switched telephone network (PSTN), or a mobile communications network.

The video phone 100 and the video phone 200 are both telephones that have video phone functions. The video phone 100 and the video phone 200 may be a telephone that has built-in video phone functions, and the telephone may be a stationary telephone or a mobile telephone. In addition, the video phone 100 and the video phone 200 may be a personal computer or a game terminal that is connected to a compact camera and in which an application is installed such that the personal computer or the game terminal can perform video phone functions. Moreover, the video phone 100 and the video phone 200 may be a television receiver that is connected to a compact camera and a device to realize video phone functions.

In the following explanation, the video phone 100 is exemplified by a television receiver that is connected to a compact camera and a device realizing video phone functions, but it goes without saying that the video phone 100 is not limited to this example. Further, in the following explanation, a video phone used by a user is the video phone 100 and a video phone used by a recipient party with whom the user is communicating is the video phone 200.

The configuration of the video phone system 1 using a telephone that has video phone functions according to the embodiment of the present invention is explained above with reference to FIG. 1. Next, the hardware configuration of the video phone 100 according to the embodiment of the present invention will be explained.

Figure 2:
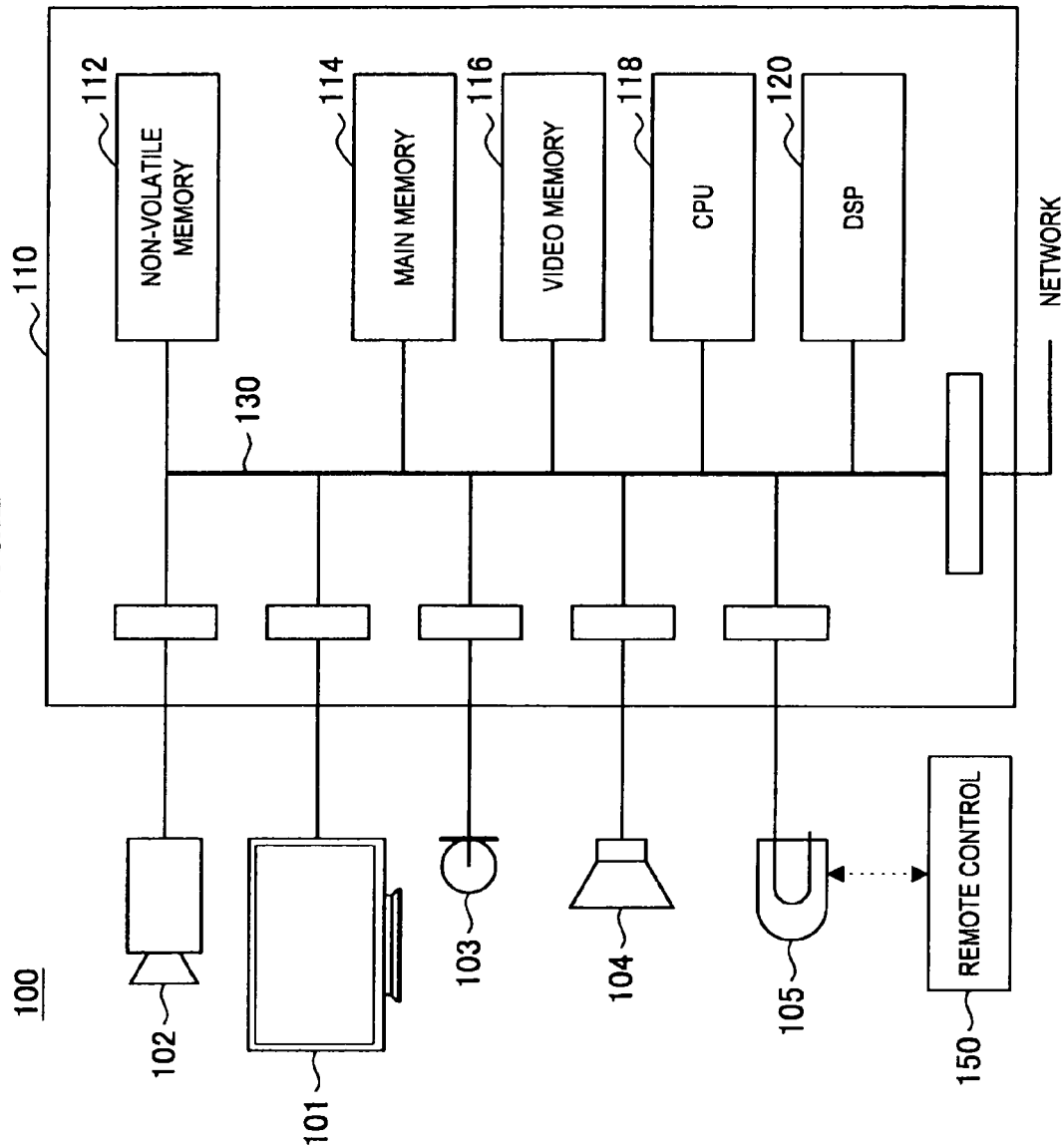
FIG. 2 is an explanatory diagram illustrating the hardware configuration of a video phone 100 according to the embodiment of the present invention.

2. Hardware Configuration of Video Phone According to Embodiment of Present Invention FIG. 2 is an explanatory diagram illustrating the hardware configuration of the video phone 100 according to the embodiment of the present invention. Hereinafter, the hardware configuration of the video phone 100 according to the embodiment of the present invention will be explained with reference to FIG. 2.

As shown in FIG. 2, the video phone 100 according to the embodiment of the present invention includes a display 101, a camera 102, a microphone 103, a speaker 104, a photoreceptor 105 and a video phone unit 110.

The display 101 is connected to the video phone unit 110, and, when a call is made to the recipient party using video phone functions, the display 101 displays images of the recipient party that are transmitted from the recipient party side video phone 200 via the network 10. A CRT monitor, a liquid crystal display, a plasma display, an organic EL display or another such display device can be used as the display 101.

The camera 102 takes images of the user. Signal processing is performed by the video phone unit 110 on user images taken by the camera 102, and the processed images are transmitted to the recipient party side video phone 200 via the network 10. The microphone 103 collects the voice of the user. Signal processing is performed by the video phone unit 110 on the user's voice collected by the microphone 103 and the processed voice is transmitted to the recipient party side video phone 200 via the network 10. The speaker 104 outputs the voice of the recipient party that is transmitted from the recipient side video phone 200 via the network 10. The camera 102, the microphone 103 and the speaker 104 are connected to the video phone unit 110.

The photoreceptor 105 receives signals emitted from a remote control 150 that operates the video phone unit 110, and transmits the received signals to the video phone unit 110. For example, when a signal to switch on a power source of the video phone unit 110 is transmitted from the remote control 150, the photoreceptor 105 receives the signal and transmits it to the video phone unit 110, and thus the power source of the video phone unit 110 is switched on. The signals from the remote control 150 may be transmitted by infrared rays, or may be transmitted wirelessly.

The video phone unit 110 is a device in which hardware and software that realize video phone functions are installed. As shown in FIG. 2, the video phone unit 110 according to the embodiment of the present invention includes a non-volatile memory 112, a main memory 114, a video memory 116, a central processing unit (CPU) 118 and a digital signal processor (DSP) 120. All the components included in the video phone unit 110 are mutually connected via a system bus 130.

The non-volatile memory 112 mainly stores computer programs that realize video phone functions. The computer programs that realize video phone functions are, for example, a video phone call program to perform call functions between the video phone 100 and the recipient side video phone 200. Software stored in the non-volatile memory 112 are read by the CPU 118 and performed sequentially. Further, the non-volatile memory 112 stores address book information. By freely selecting a recipient party from the address book information stored in the non-volatile memory 112, the user can make a call using video phone functions (or using telephone functions with audio only).

When the software stored in the non-volatile memory 112 is read and performed by the CPU 118, the main memory 114 is used as a work area for each type of processing. The video memory 116 stores image signals transmitted from the recipient party side video phone 200 and graphic data that is displayed on the display 101, such as a graphical user interface (GUI) used to perform video phone functions. In addition, when a call using video phone functions is being made between the video phone 100 and the video phone 200, the video memory 116 temporarily stores images and audio transmitted from the video phone 200.

The CPU 118 is an electronic circuit that performs numerical calculations, information processing and instrument control. According to the present embodiment, the CPU 118 reads and sequentially performs computer programs that are stored in the non-volatile memory 112 and that realize video phone functions. By sequentially performing the computer programs by the CPU 118, the video phone unit 110 can realize video phone functions.

The DSP 120 is a microprocessor suitable for digital signal processing, and, according to the present embodiment, the DSP 120 encodes and streams image signals input from the camera 102 and audio signals input from the microphone 103. The stream generated by the DSP 120 is transmitted to the recipient party side video phone 200 via the network 10, and is output on the video phone 200 as images and audio. Further, a stream transmitted from the recipient party side video phone 200 is decoded by the DSP 120 and converted to image signals and audio signals.

The hardware configuration of the video phone 100 according to the embodiment of the present invention is explained above. Next, the functional configuration of the video phone 100 according to the embodiment of the present invention will be explained.

Figure 3:
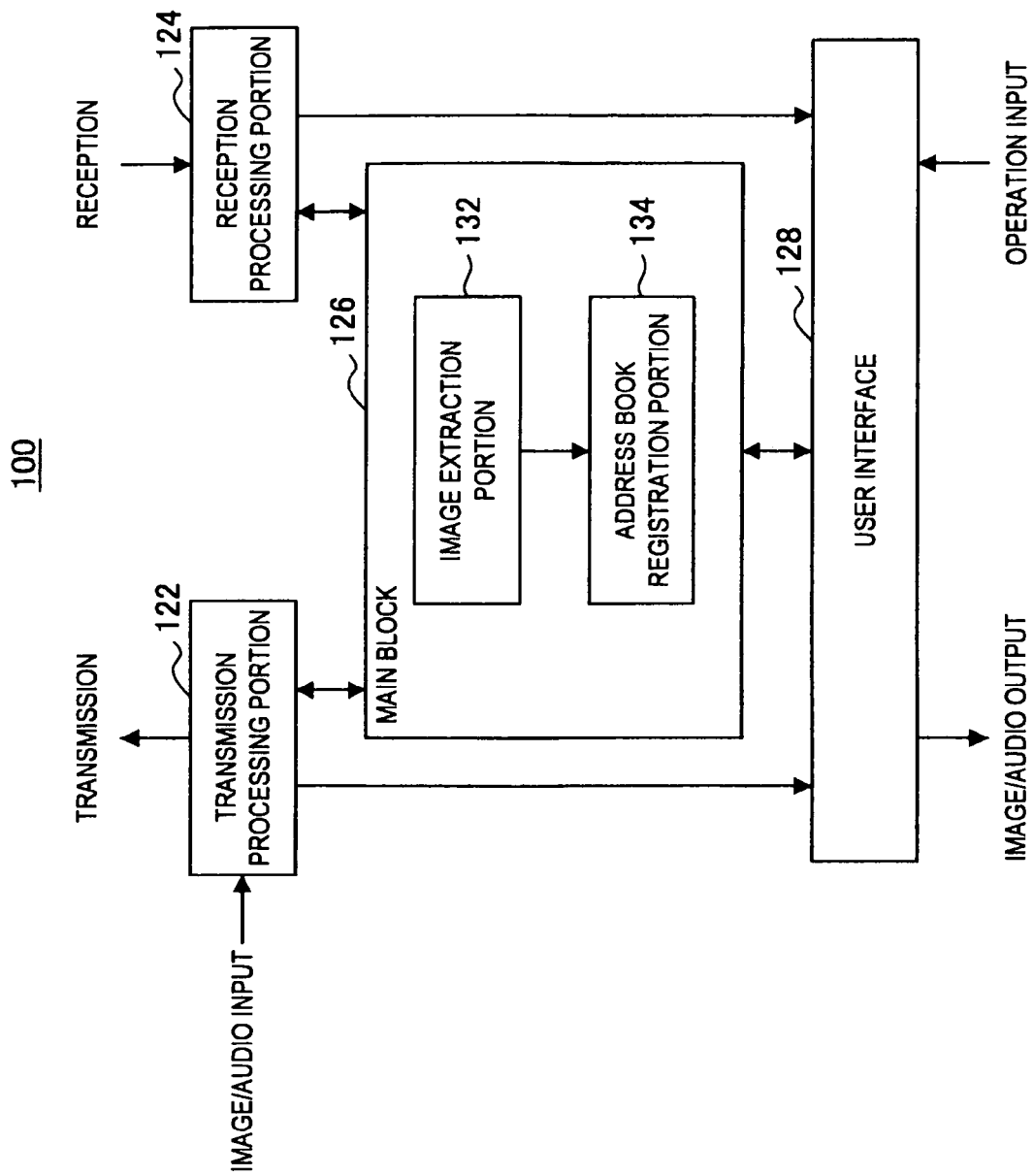
FIG. 3 is an explanatory diagram illustrating the functional configuration of the video phone 100 according to the embodiment of the present invention.

3. Functional Configuration of Video Phone According to Embodiment of Present Invention FIG. 3 is an explanatory diagram illustrating the functional configuration of the video phone 100 according to the embodiment of the present invention. Hereinafter, the functional configuration of the video phone 100 according to the embodiment of the present invention will be explained with reference to FIG. 3.

As shown in FIG. 3, the video phone 100 according to the embodiment of the present invention includes a transmission processing portion 122, a reception processing portion 124, a main block 126 and a user interface 128.

The transmission processing portion 122 performs transmission of data to the recipient party side video phone 200. For example, according to the present embodiment, when the user of the video phone 100 starts a call with the recipient party using video phone functions, the main block 126 (to be described later) performs call control with the recipient party side video phone 200. Call information used when performing the call control is sent from the transmission processing portion 122 to the network 10. When communication is established with the recipient party side video phone 200, the transmission processing portion 122 encodes digitalized image signals input from the camera 102 and digitalized audio signals input from the microphone 103. Then, the transmission processing portion 122 performs channel encoding of the encoded data, such as error correction and so on. In addition, the transmission processing portion 122 performs packetization for transmission to the recipient party side video phone 200 and transmits to the network 10.

The reception processing portion 124 performs reception of data from the recipient party side video phone 200. For example, according to the present embodiment, when the user of the video phone 100 starts a call with the recipient party using video phone functions, the main block 126 (to be described later) performs call control with the recipient party side video phone 200. When performing the call control, call control information transmitted from the recipient party side video phone 200 is received by the reception processing portion 124. Furthermore, when communication with the recipient party side video phone 200 is established, when packetized image data and audio data are received from the recipient party side video phone 200, the reception processing portion 124 performs channel decoding, image decoding and audio decoding. The image signals and audio signals obtained as a result of decoding are transmitted to the user interface 128.

The main block 126 performs various processes to realize video phone functions. For example, according to the present embodiment, when the user of the video phone 100 starts a call with the recipient party using video phone functions, call control is performed with the recipient party side video phone 200 by the main block 126. In addition, the main block 126 has a function to register images and audio in the address book stored in the non-volatile memory 112, using the image data and audio data of the recipient party that are received by the reception processing portion 124.

Further, as shown in FIG. 3, the main block 126 includes an image extraction portion 132 and an address book registration portion 134.

During a period over which a call is being performed with the video phone 200 using video phone functions, the image extraction portion 132 extracts an image that is temporarily stored in the video memory 116 and that is transmitted from the recipient party side video phone 200, as a still image or a video. A timing of the extraction by the image extraction portion 132 may be a selected timing that is instructed by the user or may be a predetermined timing that is established in advance. Furthermore, the image extraction portion 132 may analyze the images transmitted from the video phone 200 and may extract the still image or the video based on results of the analysis. The extraction of the still image or the video by the image extraction portion 132 will be explained in detail later.

The address book registration portion 134 registers, in the address book, the still image or the video extracted by the image extraction portion 132. In the present embodiment, when the call with the video phone 200 using video phone functions is ended, the address book registration portion 134 registers the still image or the video extracted by the image extraction portion 132, associating the registered image with address book information of the recipient party with whom the call was made.

The user interface portion 128 accepts operation inputs from the user of the video phone 100, and outputs images and audio transmitted from the recipient party side video phone 200 to the display 101 and the speaker 104.

The functional configuration of the video phone 100 according to the embodiment of the present invention is explained above with reference to FIG. 3. Next, operation of the video phone 100 according to the embodiment of the present invention will be explained.

4. Operation of Video Phone According to Embodiment of Present Invention

Figure 4:
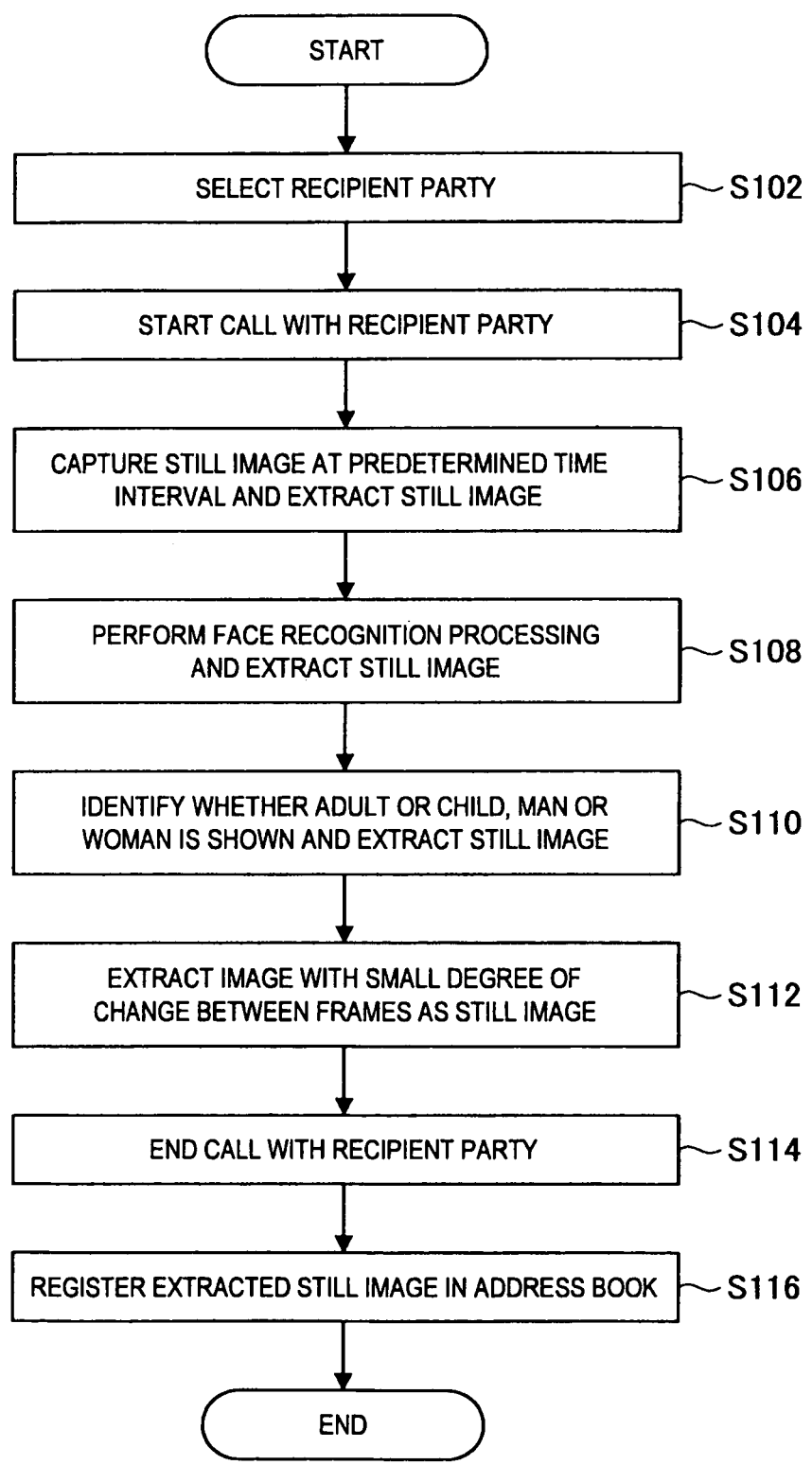
FIG. 4 is a flow chart illustrating operation of the video phone 100 according to the embodiment of the present invention.

FIG. 4 is a flow chart illustrating the operation of the video phone 100 according to the embodiment of the present invention. Hereinafter, the operation of the video phone 100 according to the embodiment of the present invention will be explained with reference to FIG. 4.

When using the video phone 100 to make a call to the recipient party using video phone functions, first, the recipient party is selected by user operation (step S102). To select the recipient party, the video phone 100 may be operated using the remote control 150 etc. to directly input the telephone number of the recipient party, or the recipient party may be selected from the address book.

Figure 5:
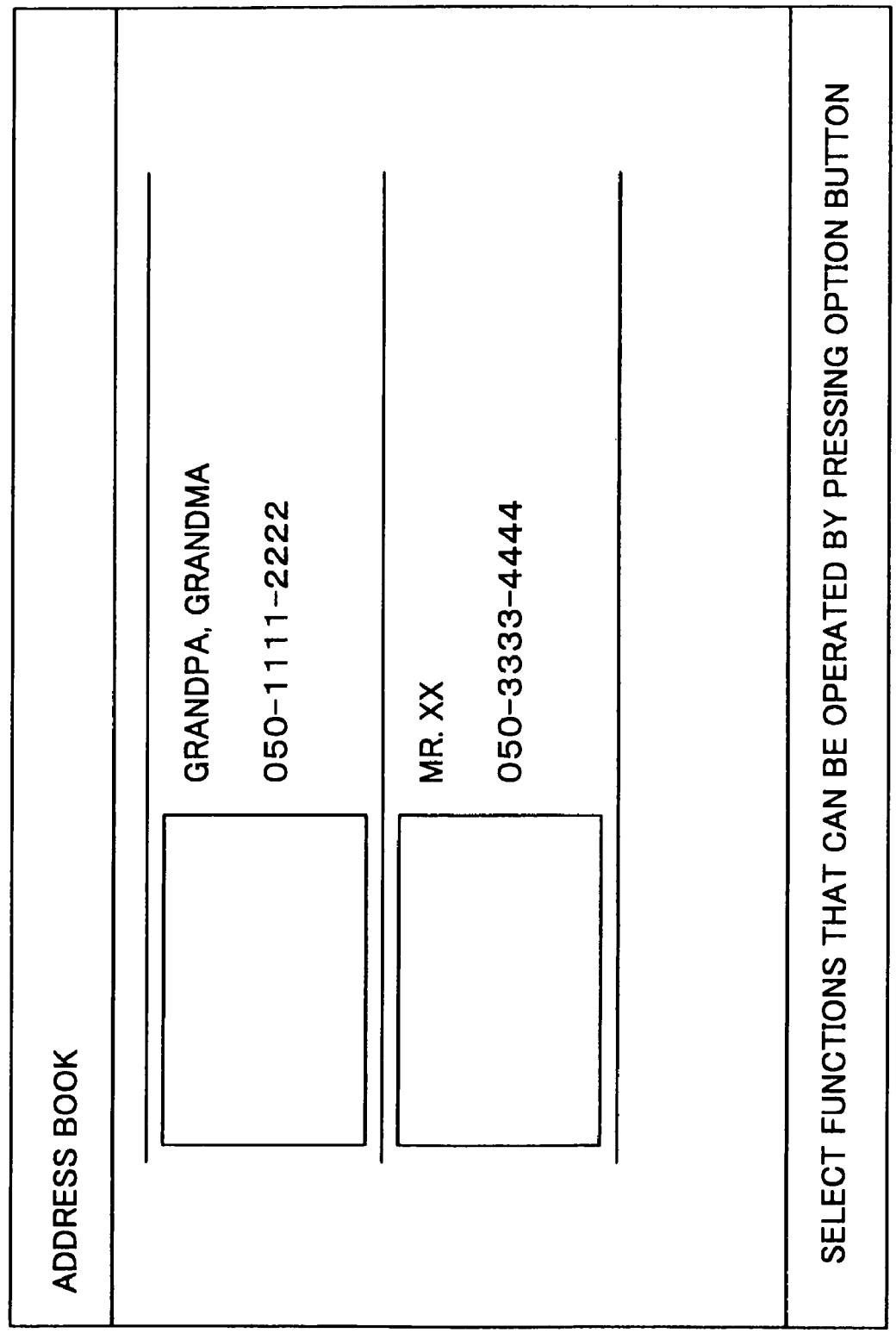
FIG. 5 is an explanatory diagram showing an example of an address book screen.

FIG. 5 is an explanatory diagram showing an example of an address book screen on the video phone 100 according to the embodiment of the present invention. The address book screen shown in FIG. 5 is displayed on the display 101 as a result of operation of the video phone 100 using the remote control 150. In a state in which the type of screen shown in FIG. 5 is displayed, the user of the video phone 100 can use the remote control 150 to operate the video phone 100 and select the recipient party.

The following explanation is an example in which a call is placed after selecting the top item "Grandpa, Grandma" as the recipient party on the address book shown in FIG. 5.

When the recipient party is selected in the above-described step S102, a connection is established with the recipient party selected in the above-described step S102 and a call with the recipient party is started (step S104). The connection with the selected recipient party may be established, for example, by generating call control information in the main block 126, transmitting the generated call control information from the transmission processing portion 122, and receiving a response from the recipient party side video phone 200 in the reception processing portion 124.

FIG. 6 is an explanatory diagram showing an example of a call screen on the video phone 100 according to the embodiment of the present invention. The call screen shown in FIG. 6 is displayed on the display 101 after the call has been started with the recipient party. As shown in FIG. 6, the call screen includes a home screen 162 and a recipient party screen 164.

The home screen 162 is a screen on which images taken by the camera 102 are displayed, and the images displayed on the home screen 162 are also displayed on the recipient party side video phone 200. Further, the recipient party screen 164 displays images of the recipient party taken by a camera of the recipient party side video phone 200. The images displayed on the recipient party screen 164 are images obtained as a result of decoding by the reception processing portion 124, and are displayed by the user interface portion 128. The user of the video phone 100 can make a call with the recipient party using video phone functions while watching the type of screen shown in FIG. 6.

Then, in the present embodiment, using the images transmitted from the recipient party side video phone 200 and obtained as a result of decoding by the reception processing portion 124, an image is automatically registered in the address book. By this type of automatic registration of the image in the address book, the image is stored in the telephone in advance, thus saving time and effort to edit video using a device other than the telephone, and the image can be easily registered. In the following explanation, an example is described in which a still image is registered in the address book.

When registering an image in the address book, the user may instruct a selected timing for image capture and the image extraction portion 132 may extract an image at the instructed timing from the images transmitted from the recipient party side video phone 200. Then, the address book registration portion 134 registers in the address book the image extracted by the image extraction portion 132. The image capture may be performed, for example, by operation of the remote control 150 by the user of the video phone 100. Furthermore, the number of images captured may be unlimited and repeatedly captured. When there is a plurality of captured images, the address book screen may successively display the captured images on the address book screen in a slide show format.

On the other hand, when registering an image in the address book, during the call with the recipient party, images transmitted from the recipient party side video phone 200 may be analyzed by the image extraction portion 132, a specific image may be extracted from the analysis results, and the extracted image may be registered in the address book by the address book registration portion 134. In the present embodiment, the following analysis process is performed.

From the image data of the recipient party, the image extraction portion 132 successively captures a still image at a predetermined time interval and extracts a still image (step S106).

The image extraction portion 132 performs face recognition processing on the image data of the recipient party, captures a frame in which a person is shown in the recipient party side image, and extracts the frame as a still image (step S108). The image extraction portion 132 performs face recognition processing by detecting facial features, such as eyebrows, eyes, nose, mouth etc. included in an image, and can use technology disclosed in Japanese Patent Application Publication No. JP-A-2008-152530, for example. For example, the image extraction portion 132 may perform face recognition processing on the image data of the recipient party, use the face recognition processing results to identify the size of the person's face shown on the recipient party side camera, capture a frame in which a large face is shown and extract the frame as the still image. Additionally, for example, the image extraction portion 132 may perform face recognition processing on the image data of the recipient party and recognize a facial expression of the person shown on the recipient party side camera. It may then capture a frame showing a smiling face and extract the frame as the still image.

The image extraction portion 132 performs face recognition processing on the image data of the recipient party and recognizes whether the recipient party is a child or an adult. It is set in advance whether to prioritize registration in the address book for an adult or a child, and a man or a woman. Then, a frame is captured based on the priority setting, and still image extraction processing is performed (step S110). Note that it may be determined whether the images included in the recipient party side image data are of an adult or not, and the sex of the person shown may be determined, by detecting the position of eyes, nose and mouth etc., for example, and based on the positional relationships between these facial features.

The image extraction portion 132 calculates the degree of change between frames of the recipient party image data and measures the intensity of movement of the recipient party images. If an image in which there is a large degree of change between frames, namely an image with intense movement, is extracted as a still image, a clear still image cannot be obtained due to camera shake or blurring of an object of the image. Therefore, an image in which there is a small degree of change between frames is extracted as the still image (step S112). Note that, the following methods may be used to measure the degree of change between frames. Each of the methods listed below may be used separately, or may be used in combination.

1. Whole screen motion vector quantity
2. Whole screen frame difference
3. Measurement of degree of movement by motion detection
4. Other frame difference/motion detection technology Note that, these analysis processes are shown in FIG. 4 as a series of processes, but in the present invention, the analysis processes may be performed separately or a plurality of the analysis processes may be performed in combination.

During a call with the recipient party, when analysis processing of the image data of the recipient party by the image extraction portion 132 is complete and a still image is extracted, after the call is ended, the still image extracted by the image extraction portion 132 is registered in the address book by the address book registration portion 134. At this time, the still image is associated with the address book information corresponding to the recipient party. When the call with the recipient party is ended (step S114), the address book registration portion 134 registers the still image extracted by the image extraction portion 132 in the address book such that the still image is registered in association with the address book information corresponding to the recipient party (step S116).

Figure 7:
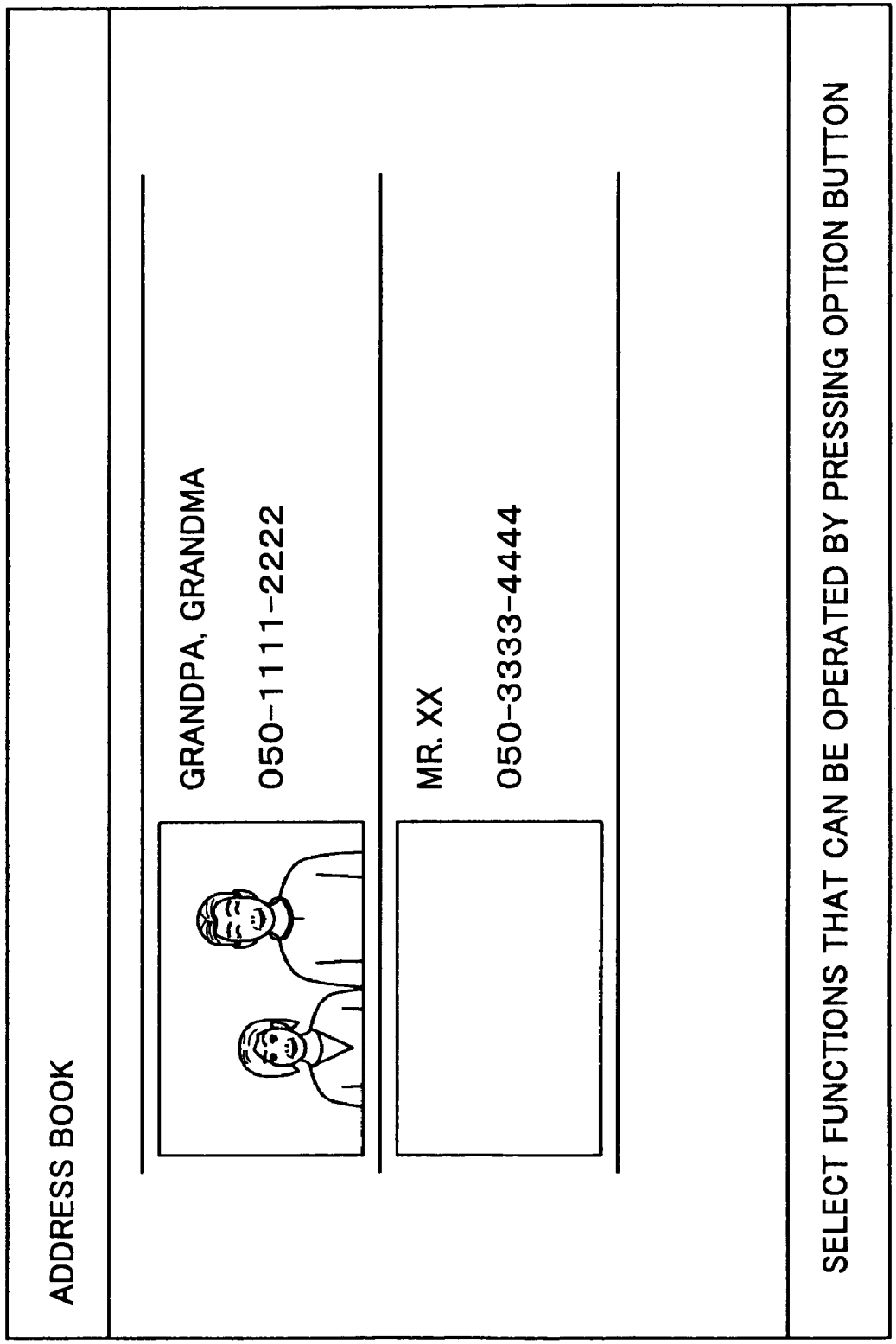
FIG. 7 is an explanatory diagram showing an example of an address book screen after ending a call.

FIG. 7 is an explanatory diagram showing an example of a screen displayed on the display 101 when, with the video phone 100 according to the embodiment of the present invention, the user instructs the video phone 100 to display the address book screen after a call with the recipient party is ended. FIG. 7 shows a case when an image is pasted by the address book registration portion 134 into the top item "Grandpa, Grandma." By automatically registering images in the address book by the address book registration portion 134 in this way, images can be easily pasted into the address book.

Figure 8:
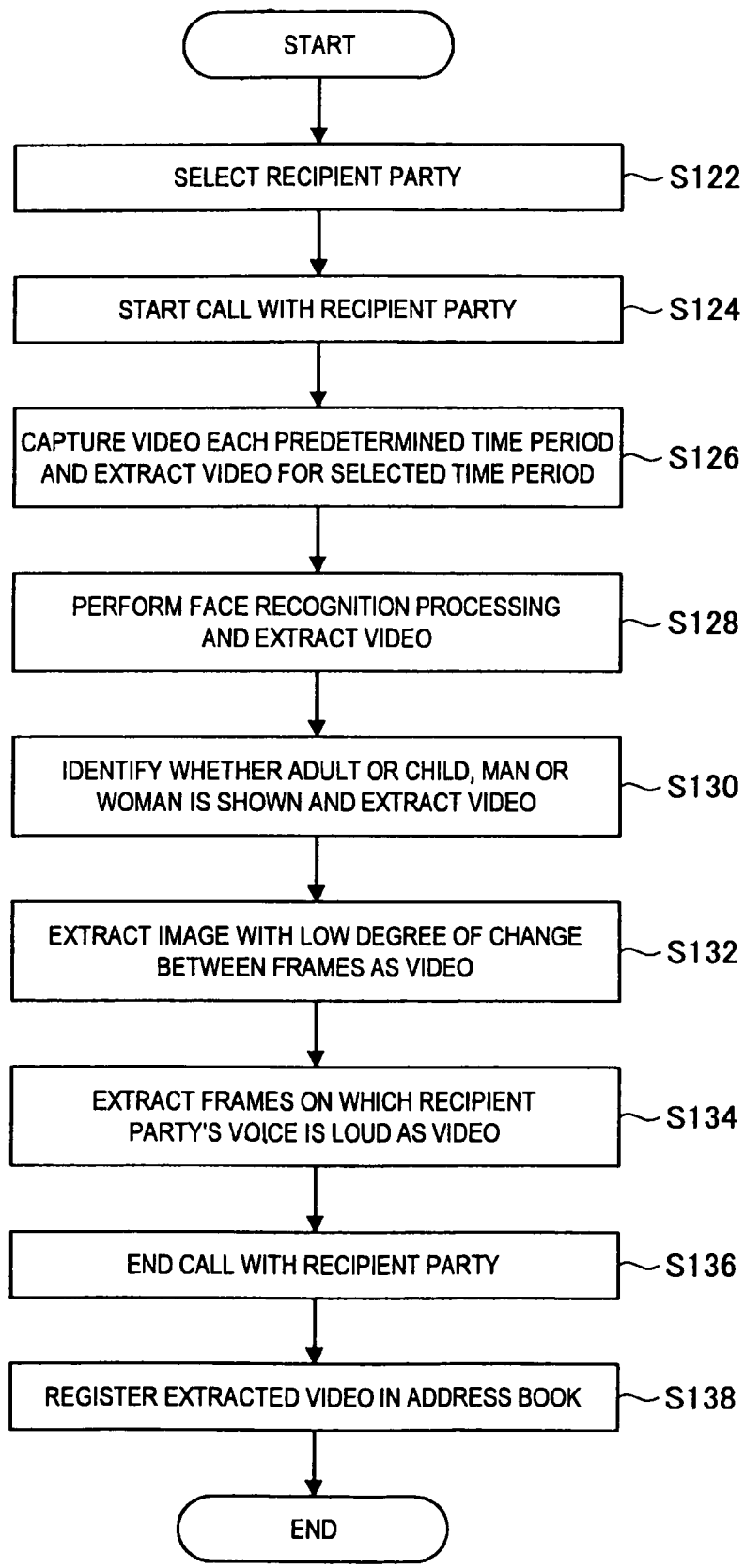
FIG. 8 is a flow chart illustrating operation of the video phone 100 according to the embodiment of the present invention.

The operation of the video phone 100 according to the embodiment of the present invention is explained above with reference to FIG. 4. In the operation of the video phone 100 according to the embodiment of the present invention shown in FIG. 4, the explanation describes an example in which a still image is registered in the address book. However, a video and not a still image may be registered in the address book. FIG. 8 is a flow chart illustrating the operation of the video phone 100 according to the embodiment of the present invention. Hereinafter, the operation of the video phone 100 according to the embodiment of the present invention will be explained with reference to FIG. 8.

In the same way as registering a still image in the address book, when the video phone 100 is used to make a call to the recipient party using video phone functions, first the recipient party is selected by user operation (step S122). To select the recipient party, the video phone 100 may be operated using the remote control 150 etc. to directly input the telephone number of the recipient party, or the recipient party may be selected from the address book.

When the recipient party is selected in the above-described step S122, a connection is established with the recipient party selected in the above-described step S122 and a call with the recipient party is started (step S124). The connection with the selected recipient party may be established, for example, by generating call control information in the main block 126, transmitting the generated call control information from the transmission processing portion 122, and receiving a response from the recipient party side video phone 200 in the reception processing portion 124.

When registering a video in the address book, the user may instruct a selected timing for video capture and the image extraction portion 132 may extract a video at the instructed timing from the videos transmitted from the recipient party side video phone 200. Then, the address book registration portion 134 registers the video extracted by the image extraction portion 132 in the address book. The video capture may be performed, for example, by operation of the remote control 150 by the user of the video phone 100. Furthermore, the number of videos captured may be unlimited. When there is a plurality of captured videos, the address book screen may successively display the captured videos on the address book screen in a slide show format.

On the other hand, when registering a video in the address book, during the call with the recipient party, videos transmitted from the recipient party side video phone 200 may be analyzed by the image extraction portion 132, a specific video may be extracted from the analysis results, and the extracted video may be registered in the address book by the address book registration portion 134. In the present embodiment, the following analysis process is performed.

From the image data of the recipient party, the image extraction portion 132 successively captures a video at a predetermined time interval and extracts a video for a selected time period (step S126).

The image extraction portion 132 performs face recognition processing on the image data of the recipient party (step S128). Face recognition processing may recognize, for example, that a person is shown on the camera of the recipient party side video phone 200, capture frames in which a person is shown and extract these frames as the video. Alternatively, for example, the processing may recognize the number of people shown on the camera of the recipient party side video phone 200, capture frames in which there are many or few people, and extract these frames as the video. Alternatively, for example, the processing may recognize the size of a person's face shown on the camera of the recipient party side video phone 200, capture frames in which a large face is shown and extract these frames as the video. Alternatively again, for example, the processing may recognize a facial expression of a person shown on the camera of the recipient party side video phone 200, capture frames showing a smiling face and extract these frames as the video. Note that, it may be determined whether the faces included in the recipient party side image data are smiling faces or not by detecting the position and shape of eyes, nose and mouth etc., for example, and the positional relationships and shapes of these facial features.

The image extraction portion 132 performs facial recognition processing on the image data of the recipient party and recognizes whether the recipient party is a child or an adult, and a man or a woman. It also recognizes the number of adults or children and the number of men or women shown. It is set in advance whether to prioritize an adult or a child, and a man or a woman, and frames including an adult or frames including a child, or frames including a man or frames including a woman are captured and extracted as the video (step S130).

The image extraction portion 132 calculates the degree of change between frames of the recipient party image data and recognizes to what degree the recipient party images are moving (the intensity of movement). Frames with a large degree of movement or frames with a small degree of movement are captured, and these frames are extracted as the video (step S132). Note that the methods for measuring the degree of change between frames described in step S112 above may be used here as methods for measuring the degree of change between frames.

Furthermore, recipient party voice data included in the recipient party image data may be analyzed by the main block 126. As a result of analysis by the main block 126, frames in which the recipient party's voice is loud are determined to be frames in which the conversation is lively, and the relevant frames are captured by the image extraction portion 132 and extracted as the video (step S134). Various methods can be used to perform the voice data analysis processing in step S134, and the present invention is not limited to a particular method.

Note that these analysis processes are shown in FIG. 8 as a series of processes, but in the present invention, the analysis processes may be performed separately or a plurality of the analysis processes may be performed in combination.

During a call to the recipient party, when analysis processing of the image data of the recipient party by the image extraction portion 132 is complete and the video is extracted, after the call is ended, the video extracted by the image extraction portion 132 is registered in the address book by the address book registration portion 134. At this time, the video is associated with the address book information corresponding to the recipient party. When the call with the recipient party is ended (step S136), the address book registration portion 134 registers the video extracted by the image extraction portion 132 in the address book such that the video is registered in association with the address book information corresponding to the recipient party (step S138).

The operation of the video phone 100 according to the embodiment of the present invention is explained above with reference to FIG. 8. In this way, by analyzing the recipient party image data by the image extraction portion 132, extracting a still image or a video and registering the extracted still image or video in the address book, images can easily be registered in the address book without saving images in advance in the video phone 100, and without performing editing of the video on a separate device.

Note that, in the above explanation, the recipient party image data is analyzed, a still image or a video is extracted and the extracted still image or video is registered in the address book. However, when the address book has a function to allow hearing of audio, audio data may be extracted and the extracted audio data may be registered in the address book.

Generally, when a call is started, the recipient party often uses a routine phrase, such as "Hello" or "XX (name) speaking." Therefore, audio data is extracted by the main block 126 from immediately after the call has started to a predetermined point in time, and is registered in the address book. By registering the above-described audio data in this way, the audio can be played back on the screen displaying the address book, and the user can recall who the recipient party is.

The period registered in the address book, for example, may be from when the recipient party first speaks immediately after the call is started to the next period of silence. A period of silence may be determined by checking the microphone level, or by checking the content of the packet and determining whether or not it is silent.

Alternatively, the period registered in the address book may be from the start of the call for a predetermined time period (three to five seconds, for example). The time period of approximately this length is a sufficient time period to include a routine phrase from the recipient party, such as "Hello," or "XX speaking."

Note that, when registering audio in the address book, an icon indicating that audio has been registered (a microphone icon, for example), may be displayed on the address book screens shown in FIG. 5 and FIG. 7, to the left of the image or to the right of the name etc.

It should be understood by those skilled in the art that various modifications, combinations, sub-combinations and alterations may occur depending on design requirements and other factors insofar as they are within the scope of the appended claims or the equivalents thereof.

5. Modified Example

In the present embodiment, for example, the image extraction portion 132 performs analysis processing on the image data from the recipient party and extracts a still image or videos. However, the number of still images and videos is not limited to one.

For example, the image extraction portion 132 performs analysis processing on the image data from the recipient party, and when a plurality of still images or videos that match prerequisites can be extracted, the address book registration portion 134 may register all the plurality of extracted still images or videos in the address book. Then, when displaying the address book in which the still images or videos are registered, the registered still images or videos may be displayed in a so-called slide show format.

Then, when displaying the still images or videos in the slide show format, an order of priority for the extracted still images or videos may be set when the image extraction portion 132 extracts the still images or videos. The following explanation describes a case in which the size of the face shown in the recipient party side camera in the above-described step S108 is recognized, and frames in which the face is large are captured and extracted as still images. In this case, the image extraction portion 132 may be set to accord highest priority to a frame in which the face is largest, and to lower the degree of priority the smaller the face is.

In addition, the explanation describes a case in which the expression of the person's face shown on the recipient party side camera in the above-described step S108 is recognized, and frames showing a smiling face are captured and extracted as still images. In this case, the image extraction portion 132 may be set to accord highest priority to a frame in which the face has the largest smile and to lower the degree of priority the smaller the smile on the face is.

The present invention can be applied to an information processing device, an information processing method and a computer program. In particular, it can be applied to an information processing device, an information processing method and a computer program that have video phone functions.

What is claimed is:

1. An information processing device, comprising:
   a recipient information recording portion that records recipient party information;
   an image recording portion that records images of the recipient party taken on the recipient party side during a call;
   an image extraction portion that automatically analyzes, selects, and extracts an image at a predetermined point in time from the images recorded in the image recording portion; and
   a registration portion that, after the call is ended, associates the image automatically extracted by the image extraction portion with the recipient party information and registers the associated image in the recipient party information recording portion.

2. The information processing device according to claim 1, wherein
   the image extraction portion automatically analyzes, selects, and extracts a still image.

3. The information processing device according to claim 2, wherein
   the image extraction portion automatically analyzes, selects, and extracts as a still image, from the images recorded in the image recording portion, a frame that includes a face.

4. The information processing device according to claim 2, wherein
   the image extraction portion detects a degree of change between frames of the images recorded in the image recording portion, and automatically analyzes, selects, and extracts as a still image a frame with a low degree of change without user interaction.

5. The information processing device according to claim 2, wherein
   the image extraction portion automatically analyzes, selects, and extracts, at a certain time interval, a still image from the images recorded in the image recording portion.

6. The information processing device according to claim 1, wherein
   the image extraction portion automatically analyzes, selects, and extracts a video without user interaction.

7. The information processing device according to claim 6, wherein
   the image extraction portion detects a degree of change between frames of the images recorded in the image recording portion, and automatically analyzes, selects, and extracts, as a video, frames with a low degree of change.

8. The information processing device according to claim 6, further comprising:
   an audio recording portion that records audio during a call with a recipient party,
   wherein
   the image extraction portion automatically analyzes, selects, and extracts, as a video, frames at a point in time at which a volume of audio recorded in the audio recording portion is louder than a volume at another point in time.

9. The information processing device according to claim 1, further comprising:
   an audio recording portion that records audio of a recipient party during a call; and
   an audio extraction portion that automatically analyzes, selects, and extracts audio at a predetermined point in time from the audio recorded in the audio recording portion,
   wherein
   after the call is ended, the registration portion registers the image automatically extracted by the image extraction portion and the audio automatically extracted by the audio extraction portion in an address book.

10. An information processing method, comprising the steps of:
    recording images of a recipient party taken on the recipient party side during a call;
    automatically analyzing, selecting, and extracting an image at a predetermined time point from the images recorded in the image recording step; and
    after the call is ended, associating the image automatically extracted in the image extracting step with recipient party information and registering the associated image in a recipient party information recording portion that records the recipient party information.

11. A non-transitory computer-readable storage medium storing a computer program that comprises executable instructions, which, when executed by a computer, command the computer to perform the steps of:
    recording images of a recipient party taken on the recipient party side during a call;
    automatically analyzing, selecting, and extracting an image at a predetermined time point from the images recorded in the image recording step; and
    after the call is ended, associating the image automatically extracted in the image extracting step with recipient party information and registering the associated image in a recipient party information recording portion that records the recipient party information.

* * * * *

UNITED STATES PATENT AND TRADEMARK OFFICE
CERTIFICATE OF CORRECTION

PATENT NO. : 8,319,818 B2  
APPLICATION NO. : 12/587390  
DATED : November 27, 2012  
INVENTOR(S) : Shuichi Takizawa Page 1 of 1

It is certified that error appears in the above-identified patent and that said Letters Patent is hereby corrected as shown below:

On the Title Page of the patent, please insert Item 30, --Foreign Applications Japan P2008-261020 filed 10/7/2008--.

Signed and Sealed this  
Fifth Day of February, 2013

Teresa Stanek Rea  
*Acting Director of the United States Patent and Trademark Office*